June 28, 1938.  H. G. VAUGHN  2,121,843

SEALING MEANS

Filed Aug. 20, 1936   2 Sheets-Sheet 1

INVENTOR.
HAROLD GAR. VAUGHN.
BY Geo. B. Pitts
ATTORNEY.

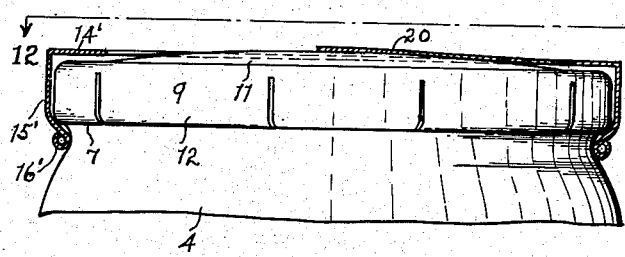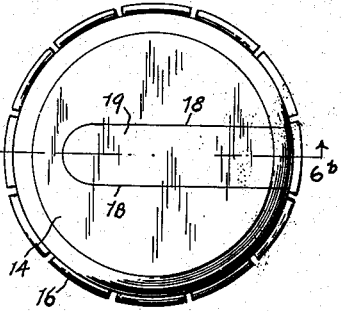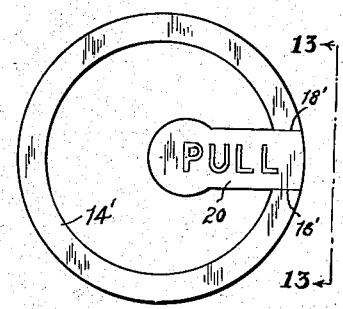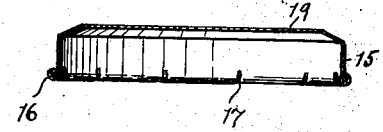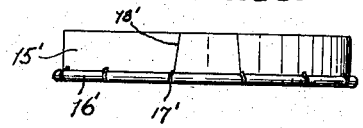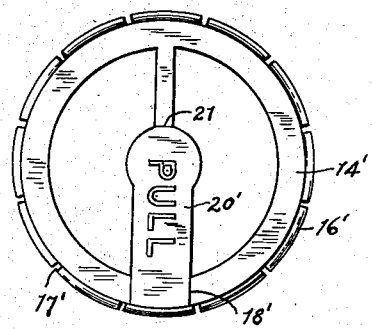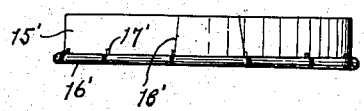

Patented June 28, 1938

2,121,843

UNITED STATES PATENT OFFICE 2,121,843

SEALING MEANS

Harold Gar Vaughn, Warren, Ohio, assignor to The Ohio Corrugating Company, Warren, Ohio, a corporation of Ohio Application August 20, 1936, Serial No. 97,061

5 Claims. (Cl. 220—29)

This invention relates to containers of various shapes and constructions for storing and shipment of liquids, semi-liquids and foods, more particularly to the sealing means therefor. The invention is adapted for sealing the container opening, and also such an opening where the latter is provided with a removable closure device (which—after the sealing means is removed—is intended to be removed and replaced from time to time, if desired), whereby unauthorized access to or removal of the closure device and/or removal or contamination of the container contents is prevented, except by first mutilating the sealing means, so that detection of any tampering is readily and positively determined; provision being made to mutilate and remove the sealing means in a ready manner by any authorized person. In the arrangement shown the sealing means is adapted to seal a closure device in position and the opening closed thereby, without damaging, loosening or unseating the closure device.

The invention is applicable to various kinds of containers, that shown herein merely for illustrative purposes being formed of sheet metal and of the type having a clamped-on cover; that is, a cover having on its perimeter separate lugs which are bent by hand or a suitable tool around and into positive engagement with a false bead or rim on the container body, but in such a container the top may be otherwise secured to the container body, as by welding or double seaming.

Great difficulty has heretofore been experienced in sealing a container opening by means of a sealing member, which was intended to be distorted, damaged or torn to detect tampering, where the opening was provided with a closure device, so that in shipment or handling of the container the closure device and/or cap were ineffective to prevent leakage. It has also been found difficult to apply a sealing member to or in association with a closure device, without distorting or damaging the latter, the effect of which was to make the device inoperative as well as to increase the danger of leakage during shipment of the container. Furthermore, sealing members now in use, and of which I have knowledge, have been found to be ineffective as a means of detection, since the member could be removed without any distortion or damage to it or with so little distortion that it could be readily re-shaped; so that in either event the sealing member could be re-placed without effecting a detection of such removal. Accordingly, one object of the invention is to provide an improved sealing member which may be readily applied to and associated with a closure device for a container opening to insure sealing thereof during shipment of the container and which cannot be removed without detection.

Another object of the invention is to provide an improved sealing member which may be applied to and associated with the closure device for a container opening to detect tampering and which may be readily applied, without distorting, damaging or loosening the closure device, whereby the latter may be removed and replaced at will, after removal of the sealing member.

Another object of the invention is to provide for a container opening an improved sealing member wherein the marginal portion of its skirt is provided with bendable tabs which may be readily bent inwardly relative to the skirt without distorting or damaging the side wall of the closure device or affecting its application to and removal from the container opening.

Another object of the invention is to provide an improved sealing member for a container opening so constructed that when positioned it cannot be tampered with without detection or removed without tearing or an otherwise substantial mutilation, but which permits ready removal by an authorized person.

Other objects of the invention will be apparent to those skilled in the art to which my invention relates from the following description taken in connection with the accompanying drawings, wherein Fig. 1 is a side elevation of a container (parts thereof being broken away) having applied thereto a sealing means embodying my invention, the sealing member being shown in section on the line 1—1 of Fig. 3.

Fig. 6a is a plan view of a sealing member having a modified form.

Fig. 6b is a section on the line 6b—6b of Fig. 6a.

Fig. 11 is a fragmentary view similar to Fig. 1, but showing a modified form of sealing means.

Fig. 12 is a plan view on the line 12—12 of Fig. 11.

Fig. 13 is a side elevation of the sealing member shown in Figs. 11 and 12.

Fig. 14 is a plan view of another modified form of sealing member.

Fig. 15 is a side elevation of the member shown in Fig. 14.

Figure 1:
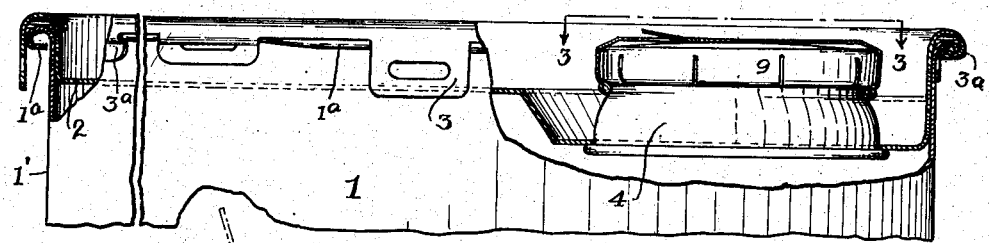

In the drawings, 1 indicates as an entirety a container comprising a body having side walls 1' (preferably of cylindrical shape in cross section) and a top or head 2, which may be integral with or permanently secured to the side walls 1 by welding, soldering, double seaming or otherwise; but in the construction shown for illustrative purposes the side walls 1' are provided with a false bead 1a and the top 2 has a circumferential flange terminating in lugs 3 which are bent by hand or a suitable tool inwardly under, into engagement with and around the false bead, as shown at 3a.

Figure 2:
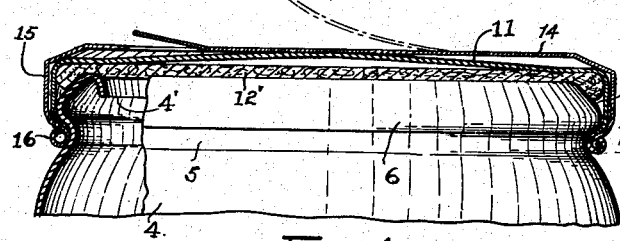
Fig. 2 is a fragmentary section of parts shown in Fig. 1, enlarged.
Figure 3:
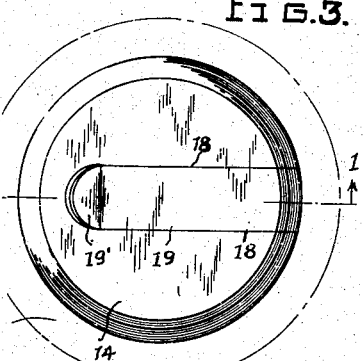
Fig. 3 is a fragmentary plan view on the line 3—3 of Fig. 1.
Figure 4:
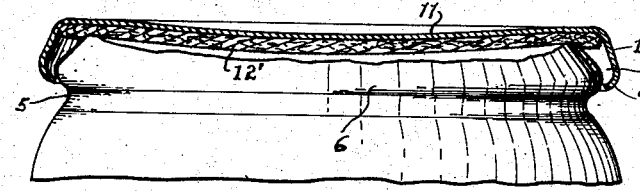
Fig. 4 is a section similar to Fig. 2, with the sealing member removed and showing the operation of removing the closure device.
Figure 5:
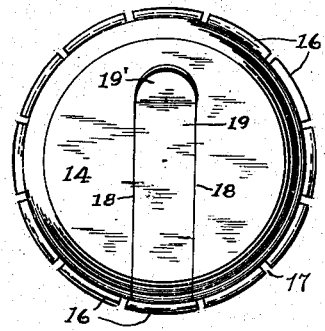
Fig. 5 is a plan of the sealing member.
Figure 7:
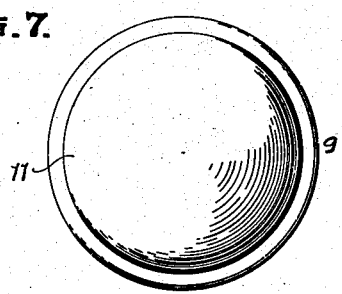
Fig. 7 is a plan view of the closure device.
Figure 8:
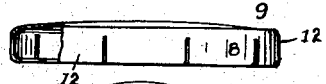
Fig. 8 is a side elevation of the closure device, parts being broken away.
Figure 6:
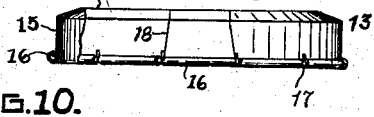
Fig. 6 is a side elevation of the sealing member, parts being broken away.
Figure 10:
Fig. 10 is a view similar to Fig. 8, but showing the closure device in the position it occupies when being applied to or removed from a container opening.
Figure 9:
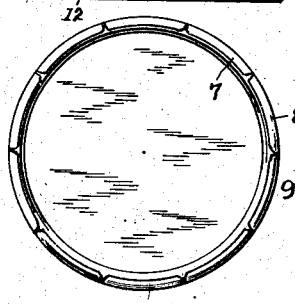
Fig. 9 is a bottom plan view of the closure device.

The top 2 is formed with an emptying opening and provided with an upstanding collar 4 in connected relation to the opening, the free end of the collar forming a seat 4' for a closure device or a sealing member when such a device is not used. Where the collar 4 is not integral with the top 2, as herein shown for illustrative purposes, its lower end is suitably secured in a liquid tight manner to the walls of the opening. The collar 4 is provided with a constricted circumferential portion 5 and an expanded circumferential portion thereabove to form a shoulder 6 for engagement by the inturned ends (to be later referred to) on the circumferential side wall 8 of a closure device 9. The upper end portion of the collar 4 is preferably inclined inwardly, as shown at 10, to facilitate the application of the closure device 9 and the marginal end of the collar may be bent back on itself to form a suitable gasket seat 4'. The formation of the collar 4, as above described, serves to reinforce it to withstand the necessary pressure utilized to position the sealing member, to which reference is later made. The closure device 9 is of the type which permits it to be applied to and removed from the collar 4, at will, being preferably formed of resilient sheet metal and consisting of a concave-convex top 11 and an integral side wall 8 (already referred to). The side wall 8 is slitted at uniformly spaced points throughout its circumference, from its free edge inwardly to approximately the connection of the side wall 8 with the top 11, whereby results a plurality of resilient fingers 12. The free ends of the fingers 12 are bent inwardly, as shown at 7, for engagement with the underside of the shoulder 6 (see Figs. 1 and 2). 12 indicates a gasket which is of a size to snugly fit within the side wall 8 of the closure device 9 so as to be retained in position therein when the device is removed, but is held in engagement with the seat 4' of the collar 4 to close the opening therethrough when the device is in position. The top of the closure device 9 is adapted to be flexed to opposite sides of an imaginary line extending substantially in the plane of the perimeter of the top, so that when the top is flexed inwardly, that is, in the direction in which the fingers 12 extend, the latter are simultaneously expanded to permit their ends 7 to freely ride over the shoulder 6 and the device 9 removably positioned on the collar 4, as shown in Fig. 4. If now inward pressure is applied to the fingers 12, the top 11 will be flexed outwardly, that is, to the opposite side of said imaginary line, the effect of which is to move the fingers inwardly with their ends below and in yielding engagement with the shoulder 6, as shown in Figs. 1 and 2, thereby securing the closure device in position. To remove the closure device 9, pressure is applied to the central portion of the top 11 to flex it inwardly, in the opposite direction, such operation serving to expand the fingers 12 and disengage them from the shoulder 6, whereby the device may be removed from the collar 4.

Referring particularly to Figs. 1, 2, 3, 5, 6, 6a and 6b, which illustrate certain forms of construction of the sealing means, 13 indicates as an entirety a sealing member adapted to be placed over the closure device 9 and engaged under and with the shoulder 6 and the inturned ends 7 of the fingers 12, to secure the member in position and seal the container opening, and to clamp the inturned ends 7 in engagement with the shoulder 6, whereby the closure device cannot be removed when the member 13 is in position. The sealing member 13 is formed of thin material, such as thin sheet metal, which (1) permits it to be readily applied, as hereinafter set forth, without distorting or damaging the closure device or affecting its capability to be removed and replaced after the sealing member 13 is detached, but (2) necessitates the distortion, damaging or tearing of the sealing member when the latter is removed or attempt is made to remove it, thereby making the member totally ineffective for replacement or re-use.

In the embodiment or form of construction shown in Figs. 1, 2, 3, 4, 5 and 6, the sealing member constitutes a cap which encloses the closure device 9 and comprises a top 14 and a surrounding skirt 15, the free circumferential edge of which is provided with an outwardly extending reinforcing and tool engaging wall 16. The wall 16 may be in the form of a flange but is preferably shown in the form of a bead. Where a flange is provided, it may be doubled back on itself for strengthening its edge. The bead 16 and adjacent portion of the skirt 15 are formed with slots 17 at uniformly spaced points circumferentially of the skirt, so that the skirt is weakened along an imaginary circumferential line coinciding with the inner ends of the slots 17, the portions of the skirt between the slots forming bendable tabs. Accordingly, when a suitable tool, having jaws mounted to move inwardly in the plane of the tabs, is operatively related to the cap and the jaws are operated inwardly into engagement with the beads 16, the pressure of the jaws will be effective to bend the tabs inwardly below and into clamping engagement with the shoulder 6 and the finger ends 7 of the closure device 9, without causing any substantial inward pressure on the skirt 15 above said line, so that danger of flexing or distorting the fingers 12 or contiguous portions of the closure device 9, when the cap is applied in position, is eliminated. Such inward bending of the tabs is carried out without imparting to the closure device or the fingers 12 thereon any upward movement thereof, the effect of which would be to permit leakage between the collar and closure device; in other words, the cap 13 is applied without affecting the sealing relation between the gasket 12 and its seat 4' so that no danger of leakage is present. The slots 17 provide ample clearance between the tabs to permit them to be bent inwardly into clamping or crimping engagement with the collar 6 and the finger ends 7, whereas the beads 16 serve to reinforce the free ends of the tabs to insure the bending of the tabs at their inner ends substantially along said imaginary circumferential line. As a result of this construction and arrangement, (a) the opening through the collar 4 is sealed against leakage, thereby permitting shipment and handling of the container and (b) the removal of the cap or any attempt to pry it off by the use of a device (such as a screw driver and the like) engaged with any of the tabs or skirt, will result in a mutilation of the tabs or skirt or tearing of the metal, so that the cap cannot be replaced without detection of such tampering.

The skirt 15 of the cap 13 preferably lies in close engagement with the fingers 12 and is held in such relation with the latter by the tabs when the latter are clamped in sealing position, the tabs also serving to secure the inturned ends 7 in engagement with the shoulder 6 to prevent removal of the closure device 9. Accordingly, when the cap 13 is in sealing position, the ends 7 of the fingers 12 are clamped against the underside of the shoulder 6 by the tabs, which therefore prevent the closure device from being pulled off without first mutilating the cap.

The cap 13 is preferably constructed to permit its ready removal by any authorized person. For this purpose I score the walls of the cap along two lines 18, 18, extending from two adjoining slots 17 along the skirt 15 and partially across the top 14, the lines of scoring being connected at their inner ends and forming between them a section or strip of metal 19 that can be readily detached or torn from the remaining portion of the cap and thus permit such portion to be removed.

In the formation of the cap, when it is to be associated with a closure device, the inner end portion of the top section 19 is detached and bent upwardly to form a wing 19' which, when grasped between the fingers or by a suitable gripping tool and pulled, facilitates the detachment of the section 19. Fig. 2 shows in dotted lines the section 19 partially detached and if upward pull thereon is continued the entire section 19 may be detached along the lines 18, 18; this operation obviously serving to mutilate the cap and permit its ready removal. Figs. 6a and 6b show a modified form of construction, that is, a sealing member having a scored section but wherein no part of the scored section is detached, as above described, so that the top of the sealing member remains closed and when positioned it supplements the function of the closure in sealing the container.

Figs. 11, 12 and 13 illustrate a sealing member of a slightly different form comprising an annular top portion 14' which engages the top of the closure device 9, provided with an integral wing 20 extending inwardly from one side of the top portion and a skirt 15' having slots 17' around its circumferential edge to provide the bendable tabs which are reinforced by the beads 16'. In applying the member shown in these views, the top portion 14' engages the top 11 of the closure device, the tabs being bent into engagement with the shoulder 6 and finger ends 7, as already described. To provide for the removal of the sealing member, the metal of the top portion 14' and skirt 15' are scored on the lines 18', preferably coinciding at their inner ends with the side edges of the wing 20 and at their outer ends with two adjacent slots 17'. By grasping the wing 20 and pulling it upwardly and laterally, the section of metal defined by the scoring may be detached from the remaining portion of the member and thus effect a mutilation thereof and its ready removal.

Figs. 14 and 15 show a construction similar to Figs. 11, 12 and 13, except that the wing indicated at 20' is integrally connected to opposite sides of the top portion 14' and scored on a transverse line 21, so that the sectional portion connected to the top portion 14' along the scored lines 18' may be detached from the other sectional portion and detached, as above described to effect mutilation and ready removal of the sealing member.

From the foregoing description it will be noted that the sealing member seals the container opening to prevent leakage at all times, thereby permitting shipment of the container, it prevents removal of the closure device so long as the cap is in position, the member is so constructed that it may be readily applied and removed without affecting the operability of the closure device, and it is a positive detection member since it cannot be tampered with or removed except by a mutilation which prevents its re-use.

To those skilled in the art to which my invention relates many changes in construction and widely differing embodiments and applications of the invention will suggest themselves without departing from its spirit and scope. My disclosures and the description herein are purely illustrative and are not intended to be in any sense limiting.

It will be noted that the walls or flanges, shown as beads herein, on the free ends of the tabs, project outwardly therefrom and are therefore in position to be engaged by the jaws of the tool to effect the inward bending of the tabs.

What I claim is:

1. A deformable anti-tampering, removable sealing member adapted to be positioned over the closure for a container opening, formed of thin sheet metal and comprising a top portion and a skirt, the marginal portion of the skirt being formed in its circumference with spaced slots extending inwardly from the free edge of said marginal portion to provide between them crimping tabs, the free ends of said tabs being beaded and said tabs being bendable inwardly substantially along imaginary lines connecting the inner ends of said slots.

2. A sealing member for a container opening formed of thin material and comprising an annular top portion provided with a strip connected to opposite sides thereof and a skirt, the marginal portion of said skirt being slotted inwardly from its circumferential edge to form bendable tabs around its marginal portion, said skirt and top portion being scored along lines at opposite sides of said strip and each score line extending from the inner edge of said top portion to one of said slots and said strip being scored transversely between its connections with said top portion.

3. A deformable anti-tampering, removable sealing member formed of thin sheet metal and adapted to be related to a replaceable closure device having resilient fingers for engaging the walls of a container opening, and comprising a portion overlying a portion of the closure device and a skirt surrounding the resilient fingers of the closure device, the marginal portion of said skirt below the free circumferential edges of said fingers being formed in its circumference with spaced slots to provide crimping tabs adapted to be bent inwardly below and without pressure on the resilient fingers, the free ends of said tabs being beaded and said slots extending inwardly from the marginal edge of said skirt to approximately the line on which said tabs are bent inwardly.

4. A deformable anti-tampering, removable sealing device formed of thin sheet metal and comprising a cup-shaped member adapted to enclose the top and side walls of a closure, the skirt of said member normally extending beyond the side walls of the closure and its free edge being beaded, said beaded edge and skirt being formed with spaced slots which extend from said edge to approximately the terminating edges of said side walls to form tabs adapted to be bent inwardly substantially on lines connecting the inner ends of said slots.

5. A deformable anti-tampering, removable sealing member for protecting the closure for a container spout having an external annular shoulder, formed of thin sheet metal and comprising an annular top wall for engaging the top of the closure and a skirt normally depending below the side portion of the closure, the marginal edge of said skirt being formed with uniformly spaced, inwardly extending slots terminating approximately at the free ends of the closure side portions to form tabs adapted to be bent inwardly into engagement with the annular shoulder of the container spout, the free ends of said tabs being beaded and said top wall being scored along a substantially radial line.

HAROLD GAR VAUGHN.